US009046022B2

(12) United States Patent
Blakeman et al.

(10) Patent No.: US 9,046,022 B2
(45) Date of Patent: *Jun. 2, 2015

(54) CATALYSED SUBSTRATE MONOLITH

(71) Applicant: Johnson Matthey Public Limited Company, London (GB)

(72) Inventors: Philip Gerald Blakeman, Philadelphia, PA (US); Gavin Michael Brown, Saffron Walden (GB); Sougato Chatterjee, Wayne, PA (US); Andrew Francis Chiffey, Ware (GB); Jane Gast, Spring City, PA (US); Paul Richard Phillips, Royston (GB); Raj Rao Rajaram, Slough (GB); Glen Spreitzer, Collegeville, PA (US); Andrew Peter Walker, Hazlemere (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,247

(22) Filed: Mar. 6, 2014

(65) Prior Publication Data

US 2014/0186244 A1 Jul. 3, 2014

Related U.S. Application Data

(63) Continuation of application No. 13/711,120, filed on Dec. 11, 2012, now Pat. No. 8,667,785.

(60) Provisional application No. 61/569,523, filed on Dec. 12, 2011.

(30) Foreign Application Priority Data

Jan. 18, 2012 (GB) .................. 1200780.3

(51) Int. Cl.
| | | |
|---|---|---|
| *B01D 46/00* | (2006.01) | |
| *B01D 53/94* | (2006.01) | |
| *F01N 3/035* | (2006.01) | |
| *F01N 3/28* | (2006.01) | |
| *F01N 3/20* | (2006.01) | |
| *B01J 23/42* | (2006.01) | |
| *B01J 23/44* | (2006.01) | |

(Continued)

(52) U.S. Cl.
CPC .............. *F01N 3/208* (2013.01); *B01J 23/42* (2013.01); *B01J 23/44* (2013.01); *B01J 35/0006* (2013.01); *B01D 53/9418* (2013.01); *B01D 53/944* (2013.01); *B01D 53/9472* (2013.01); *B01D 53/9477* (2013.01); *B01D 53/9481* (2013.01); *F01N 3/2066* (2013.01); *B01D 2255/1021* (2013.01); *B01D 2255/1023* (2013.01); *B01D 2255/104* (2013.01); *B01D 2255/106* (2013.01); *B01D 2255/2065* (2013.01); *B01D 2255/20707* (2013.01); *B01D 2255/20715* (2013.01); *B01D 2255/2092* (2013.01); *B01D 2255/30* (2013.01); *B01D 2255/407* (2013.01); *B01D 2255/9022* (2013.01); *B01D 2255/9155* (2013.01); *B01D 2258/012* (2013.01); *Y02T 10/24* (2013.01); *F01N 3/035* (2013.01); *F01N 2510/0682* (2013.01); *B01J 37/0246* (2013.01); *B01J 37/038* (2013.01); *B01J 23/40* (2013.01); *B01J 23/63* (2013.01); *B01J 29/7615* (2013.01); *B01J 29/763* (2013.01); *B01J 35/04* (2013.01); *B01J 2229/186* (2013.01); *B01J 2229/42* (2013.01); *B01J 37/0244* (2013.01)

(58) Field of Classification Search
CPC ........ B01D 46/00; B01D 53/94; F01N 3/035; F01N 3/28
USPC ....... 95/285; 55/DIG. 30; 423/213.5; 60/274, 60/299, 301; 502/325, 339, 439, 500, 502/527.12
See application file for complete search history.

(56) References Cited

U.S. PATENT DOCUMENTS

| | | |
|---|---|---|
| 4,774,069 A | 9/1988 | Handley |
| 5,473,887 A | 12/1995 | Takeshima et al. |

(Continued)

FOREIGN PATENT DOCUMENTS

| | | |
|---|---|---|
| DE | 60020070 T2 | 1/2006 |
| EP | 0341832 A2 | 11/1989 |

(Continued)

OTHER PUBLICATIONS

Cavataio, G. et al., "Impact and Prevention of Ultra-Low Contamination of Platinum Group Metals on SCR Catalysts Due to DOC Design," 2009, SAE Technical Paper 2009-01-0627.

(Continued)

*Primary Examiner* — Timothy Vanoy
(74) *Attorney, Agent, or Firm* — Kevin M. Carroll

(57) ABSTRACT

A catalysed substrate monolith 12 for use in treating exhaust gas emitted from a lean-burn internal combustion engine, which catalysed substrate monolith 12 comprising a first washcoat coating 16 and a second washcoat coating 18, wherein the first washcoat coating comprises a catalyst composition comprising at least one platinum group metal (PGM) and at least one support material for the at least one PGM, wherein at least one PGM in the first washcoat coating is liable to volatilise when the first washcoat coating is exposed to relatively extreme conditions including relatively high temperatures, wherein the second washcoat coating comprises at least one metal oxide for trapping volatilised PGM and wherein the second washcoat coating is oriented to contact exhaust gas that has contacted the first washcoat coating.

46 Claims, 6 Drawing Sheets

(51) Int. Cl.
*B01J 35/00* (2006.01)
*B01J 37/02* (2006.01)
*B01J 37/03* (2006.01)
*B01J 23/40* (2006.01)
*B01J 23/63* (2006.01)
*B01J 29/76* (2006.01)
*B01J 35/04* (2006.01)

(56) References Cited

U.S. PATENT DOCUMENTS

| | | | |
|---|---|---|---|
| 6,080,375 A | 6/2000 | Mussmann et al. | |
| 6,093,378 A | 7/2000 | Deeba et al. | |
| 6,348,430 B1 | 2/2002 | Lindner et al. | 502/304 |
| 6,753,294 B1 | 6/2004 | Brisley et al. | |
| 6,835,689 B1 | 12/2004 | He et al. | |
| 7,550,124 B2 | 6/2009 | Chen et al. | 423/213.2 |
| 7,758,834 B2 | 7/2010 | Chen et al. | 423/213.2 |
| 8,252,258 B2 | 8/2012 | Müller-Stach et al. | |
| 8,318,632 B2 | 11/2012 | Matsueda et al. | |
| 8,415,269 B2 | 4/2013 | Hao et al. | |
| 8,667,785 B2 * | 3/2014 | Blakeman et al. | 60/299 |
| 2001/0053340 A1 | 12/2001 | Noda et al. | |
| 2004/0209769 A1 | 10/2004 | Demel et al. | |
| 2006/0030481 A1 * | 2/2006 | LaBarge et al. | 502/324 |
| 2006/0057046 A1 | 3/2006 | Punke et al. | |
| 2007/0157607 A1 | 7/2007 | Pfefferle | |
| 2008/0045405 A1 | 2/2008 | Beutel et al. | |
| 2008/0125308 A1 | 5/2008 | Fujdala et al. | |
| 2009/0196812 A1 | 8/2009 | Bull et al. | |
| 2009/0260349 A1 | 10/2009 | Gandhi et al. | |
| 2009/0285737 A1 | 11/2009 | Bull et al. | |
| 2010/0016150 A1 | 1/2010 | Yabuzaki et al. | |
| 2010/0166629 A1 | 7/2010 | Deeba | |
| 2010/0175372 A1 | 7/2010 | Lambert et al. | |
| 2010/0180581 A1 | 7/2010 | Grubert et al. | |
| 2010/0183490 A1 | 7/2010 | Hoke et al. | 423/213.5 |
| 2010/0215557 A1 | 8/2010 | Liu et al. | 423/213.5 |
| 2010/0221154 A1 | 9/2010 | Lee et al. | |
| 2010/0263357 A1 | 10/2010 | Lindner et al. | 60/299 |
| 2010/0290964 A1 | 11/2010 | Southward et al. | |
| 2011/0014099 A1 | 1/2011 | Dornhaus et al. | |
| 2011/0064632 A1 | 3/2011 | Huang et al. | |
| 2011/0064633 A1 | 3/2011 | Huang et al. | |
| 2011/0099975 A1 | 5/2011 | Bailey et al. | |
| 2011/0138777 A1 | 6/2011 | Jen et al. | |
| 2011/0143921 A1 | 6/2011 | Hao et al. | |
| 2011/0173950 A1 | 7/2011 | Wan et al. | |
| 2011/0206584 A1 | 8/2011 | Dobson et al. | |
| 2011/0286900 A1 | 11/2011 | Caudle et al. | |
| 2012/0128558 A1 | 5/2012 | Nunan et al. | 423/213.5 |
| 2013/0084222 A1 | 4/2013 | Grubert et al. | 422/170 |
| 2013/0089481 A1 | 4/2013 | Sumiya et al. | |
| 2013/0149207 A1 | 6/2013 | Castagnola et al. | |
| 2013/0149222 A1 | 6/2013 | Blakeman et al. | |
| 2013/0149223 A1 | 6/2013 | Blakeman et al. | |

FOREIGN PATENT DOCUMENTS

| | | |
|---|---|---|
| EP | 0622107 A2 | 11/1994 |
| EP | 0766993 A2 | 4/1997 |
| EP | 0830201 B1 | 1/2000 |
| EP | 1925362 A1 | 5/2008 |
| EP | 2275194 A1 | 1/2011 |
| EP | 2520354 A1 | 11/2012 |
| EP | 2535102 A1 | 12/2012 |
| GB | 2375059 A | 11/2002 |
| GB | 2406803 A | 4/2005 |
| JP | 62068544 A | 3/1987 |
| JP | 4022707 A | 1/1992 |
| JP | 09271674 A | 10/1997 |
| JP | 2006272064 A | 10/2006 |
| JP | 2007229679 A | 9/2007 |
| JP | 2008279352 A | 11/2008 |
| WO | 9947260 A1 | 9/1999 |
| WO | 0059630 A1 | 10/2000 |
| WO | 0112320 A1 | 2/2001 |
| WO | 2005016497 A1 | 2/2005 |
| WO | 2008132452 A2 | 11/2008 |
| WO | 2009093071 A1 | 7/2009 |
| WO | 2009136206 A1 | 11/2009 |
| WO | 2010075345 A2 | 7/2010 |
| WO | 2010133309 A1 | 11/2010 |
| WO | 2011080525 A1 | 7/2011 |
| WO | 2011082357 A2 | 7/2011 |
| WO | 2011092521 A1 | 8/2011 |
| WO | 2011131324 A1 | 10/2011 |
| WO | 2012133055 A1 | 10/2012 |
| WO | 2012147376 A1 | 11/2012 |
| WO | 2012156883 A1 | 11/2012 |
| WO | 2012175948 A1 | 12/2012 |

OTHER PUBLICATIONS

Jen, H-W. et al., "Detection, Origin and Effect of Ultra-Low Platinum Contamination on Diesel-SCR Catalysts," Powertrains, Fuels & Lubricants Meeting, Rosemont, Illinois, Oct. 6-9, 2008, SAE Technical Paper 2008-01-2488.

GB Search Report dated Mar. 14, 2012 for corresponding GB Application No. GB1200780.3 filed Jan. 18, 2012.

GB Search Report dated Jan. 15, 2013 for corresponding GB Application No. GB1222280.8 filed Dec. 11, 2012.

International Search Report dated Jun. 4, 2013 for corresponding PCT International Patent Application No. PCT/GB2012/053090 filed Dec. 11, 2012.

* cited by examiner

CATALYSED SUBSTRATE MONOLITH

CROSS REFERENCE TO RELATED APPLICATIONS

This is a continuation of application Ser. No. 13/711,120, filed Dec. 11, 2012, issued as U.S. Pat. No. 8,667,785 on Mar. 11, 2014, which claims priority to U.S. Provisional Application No. 61/569,523, filed on Dec. 12, 2011 and United Kingdom Application No. 1200780.3, filed Jan. 18, 2012. The entire teachings of the above applications are incorporated herein by reference.

FIELD OF THE INVENTION

The present invention relates to a catalysed substrate monolith for use in treating exhaust gas emitted from a lean-burn internal combustion engine, particularly vehicular internal combustion engines, which catalysed substrate monolith comprising a first washcoat coating and a second washcoat coating.

BACKGROUND TO THE INVENTION

Generally, there are four classes of pollutant that are legislated against by inter-governmental organisations throughout the world: carbon monoxide (CO), unburned hydrocarbons (HC), oxides of nitrogen ($NO_x$) and particulate matter (PM).

As emissions standards for permissible emission of such pollutants in exhaust gases from vehicular engines become progressively tightened, a combination of engine management and multiple catalyst exhaust gas aftertreatment systems are being proposed and developed to meet these emission standards. For exhaust systems containing a particulate filter, it is common for engine management to be used periodically (e.g. every 500 km) to increase the temperature in the filter in order to combust substantially all remaining soot held on the filter thereby to return the system to a base-line level. These engine managed soot combustion events are often called "filter regeneration". While a primary focus of filter regeneration is to combust soot held on the filter, an unintended consequence is that one or more catalyst coatings present in the exhaust system, e.g. a filter coating on the filter itself (a so-called catalysed soot filter (CSF)) an oxidation catalyst (such as a diesel oxidation catalyst (DOC)) or a $NO_x$ adsorber catalyst (NAC) located upstream or downstream of the filter (e.g. a first DOC followed by a diesel particulate filter, followed in turn by a second DOC and finally a SCR catalyst) can be regularly exposed to high exhaust gas temperatures, depending on the level of engine management control in the system. Such conditions may also be experienced with unintended occasional engine upset modes or uncontrolled or poorly controlled regeneration events. However, some diesel engines, particularly heavy duty diesel engines operating at high load, may even expose catalysts to significant temperatures, e.g. >600° C. under normal operating conditions.

As vehicle manufacturers develop their engines and engine management systems for meeting the emission standards, the Applicant/Assignee is being asked by the vehicle manufacturers to propose catalytic components and combinations of catalytic components to assist in the goal of meeting the emission standards. Such components include DOCs for oxidising CO, HCs and optionally NO also; CSFs for oxidising CO, HCs, optionally for oxidising NO also, and for trapping particulate matter for subsequent combustion; NACs for oxidising CO and IC and for oxidising nitrogen monoxide (NO) and absorbing it from a lean exhaust gas and to desorb adsorbed $NO_x$ and for reducing it to $N_2$ in a rich exhaust gas (see below); and selective catalytic reduction (SCR) catalysts for reducing $NO_x$ to $N_2$ in the presence of a nitrogenous reductant, such as ammonia (see below).

In practice, catalyst compositions employed in DOCs and CSFs are quite similar. Generally, however, a principle difference between the use of a DOC and a CSF is the substrate monolith onto which the catalyst composition is coated: in the case of a DOC, the substrate monolith is typically a flow-through substrate monolith, comprising a metal or ceramic honeycomb monolith having an array of elongate channels extending therethrough, which channels are open at both ends; a CSF substrate monolith is a filtering monolith such as a wall-flow filter, e.g. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternately separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing back-pressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition. However, in particular embodiments of the present invention, the filter inlet is coated with one or more layers, which layers may be the same or a different catalyst composition. It has also been proposed to coat a NAC composition on a filtering substrate monolith (see e.g. EP 0766993).

In exhaust systems comprising multiple catalyst components, each comprising a separate substrate monolith, typically, the SCR catalyst is located downstream of a DOC and/or a CSF and/or a NAC because it is known that by oxidising some nitrogen oxide (NO) in the exhaust gas to nitrogen dioxide ($NO_2$) so that there is about a 1:1 ratio of $NO:NO_2$ exiting the DOC and/or the CSF and/or the NAC, the downstream SCR reaction is promoted (see below). It is also well known from EP341832 (the so-called Continuously Regenerating Trap or CRT®) that $NO_2$, generated by oxidising NO in exhaust gas to $NO_2$, can be used to combust soot passively on a downstream filter. In exhaust system arrangements where the process of EP341832 is important, were the SCR catalyst to be located upstream of the filter, this would reduce or prevent the process of combusting trapped soot in $NO_2$, because a majority of the $NO_x$ used for combusting the soot would likely be removed on the SCR catalyst.

However, a preferred system arrangement for light-duty diesel vehicles is a diesel oxidation catalyst (DOC) followed by a nitrogenous reductant injector, then a SCR catalyst and finally a catalysed soot filter (CSF). A short hand for such an arrangement is "DOC/SCR/CSF". This arrangement is preferred for light-duty diesel vehicles because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible. Were a large thermal mass filter to be placed upstream of the SCR catalyst, i.e. between the DOC and the SCR catalyst ("DOC/CSF/SCR"), (i) and (ii) would take far longer to achieve and $NO_x$ conversion as a whole of the emission standard drive cycle could be reduced. Particulate removal can be done using oxygen and occasional forced regeneration of the filter using engine management techniques.

It has also been proposed to coat a SCR catalyst washcoat on a filter substrate monolith itself (see e.g. WO 2005/016497), in which case an oxidation catalyst may be located upstream of the SCR-coated filter substrate (whether the oxidation catalyst is a component of a DOC, a CSF or a NAC) in order to modify the $NO/NO_2$ ratio for promoting $NO_x$ reduction activity on the SCR catalyst. There have also been proposals to locate a NAC upstream of a SCR catalyst disposed on a flow-through substrate monolith, which NAC can generate $NH_3$ in situ during regeneration of the NAC (see below). One such proposal is disclosed in GB 2375059.

NACs are known e.g. from U.S. Pat. No. 5,473,887 and are designed to adsorb $NO_x$ from lean exhaust gas (lambda>1) and to desorb the $NO_x$ when the oxygen concentration in the exhaust gas is decreased. Desorbed $NO_x$ may be reduced to $N_2$ with a suitable reductant, e.g. engine fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, (i.e. substantially more than is required for use as a promoter such as a promoter in a three-way catalyst), of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (1); \text{ and}$$

$$BaO + 2NO_2 + \tfrac{1}{2}O_2 \rightarrow Ba(NO_3)_2 \quad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + \tfrac{3}{2}O_2 \text{ or } Ba(NO_3)_2 \rightarrow BaO + 2NO_2 + \tfrac{1}{2}O_2 \quad (3); \text{ and}$$

$$NO + CO \rightarrow \tfrac{1}{2}N_2 + CO_2 \quad (4);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (1)-(4) inclusive herein above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of CO to $CO_2$ and unburned HCs to $CO_2$ and $H_2O$. Typical oxidation catalysts include platinum and/or palladium on a high surface area support.

The application of SCR technology to treat $NO_x$ emissions from vehicular internal combustion (IC) engines, particularly lean-burn IC engines, is well known. Examples of nitrogenous reductants that may be used in the SCR reaction include compounds such as nitrogen hydrides, e.g. ammonia ($NH_3$) or hydrazine, or an $NH_3$ precursor.

$NH_3$ precursors are one or more compounds from which $NH_3$ can be derived, e.g. by hydrolysis. Decomposition of the precursor to ammonia and other by-products can be by hydrothermal or catalytic hydrolysis. $NH_3$ precursors include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature. Presently, urea is the preferred source of $NH_3$ for mobile applications because it is less toxic than $NH_3$, it is easy to transport and handle, is inexpensive and commonly available. Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable.

SCR has three main reactions (represented below in reactions (5)-(7) inclusive) which reduce $NO_x$ to elemental nitrogen.

$$4NH_3 + 4NO + O_2 \rightarrow 4N_2 + 6H_2O \text{ (i.e. 1:1 } NH_3\text{:NO)} \quad (5)$$

$$4NH_3 + 2NO + 2NO_2 \rightarrow 4N_2 + 6H_2O \text{ (i.e. 1:1 } NH_3\text{:}NO_x\text{)} \quad (6)$$

$$8NH_3 + 6NO_2 \rightarrow 7N_2 + 12H_2O \text{ (i.e. 4:3 } NH_3\text{:}NO_x\text{)} \quad (7)$$

A relevant undesirable, non-selective side-reaction is:

$$2NH_3 + 2NO_2 \rightarrow N_2O + 3H_2O + N_2 \quad (8)$$

In practice, reaction (7) is relatively slow compared with reaction (5) and reaction (6) is quickest of all. For this reason, when skilled technologists design exhaust aftertreatment systems for vehicles, they often prefer to dispose an oxidation catalyst element (e.g. a DOC and/or a CSF and/or a NAC) upstream of an SCR catalyst.

When certain DOCs and/or NACs and/or CSFs become exposed to the high temperatures e.g. encountered during filter regeneration and/or an engine upset event and/or (in certain heavy-duty diesel application) normal high temperature exhaust gas, it is possible given sufficient time at high temperature for low levels of platinum group metal components, particularly Pt, to volatilise from the DOC and/or the NAC and/or the CSF components and subsequently for the platinum group metal to become trapped on a downstream SCR catalyst. This can have a highly detrimental effect on the performance of the SCR catalyst, since the presence of Pt leads to a high activity for competing, non-selective ammonia oxidation such as in reaction (9) (which shows the complete oxidation of $NH_3$), thereby producing secondary emissions and/or unproductively consuming $NH_3$.

$$4NH_3 + 5O_2 \rightarrow 4NO + 6H_2O \qquad (9)$$

One vehicle manufacturer has reported the observation of this phenomenon in SAE paper 2009-01-0627, which is entitled "Impact and Prevention of Ultra-Low Contamination of Platinum Group Metals on SCR catalysts Due to DOC Design" and includes data comparing the $NO_x$ conversion activity against temperature for a Fe/zeolite SCR catalyst located in series behind four suppliers' platinum group metal (PGM)-containing DOCs that were contacted with a flowing model exhaust gas at 850° C. for 16 hours. The results presented show that the $NO_x$ conversion activity of a Fe/zeolite SCR catalyst disposed behind a 20Pt:Pd DOC at 70 gft$^{-3}$ total PGM was negatively altered at higher evaluation temperatures as compared to lower evaluation temperatures as a result of Pt contamination. Two 2Pt:Pd DOCs from different suppliers at 105 gft$^{-3}$ total PGM were also tested. In a first 2Pt:Pd DOC, the SCR catalyst activity was affected to a similar extent as the test on the 20Pt:Pd DOC, whereas for the second 2Pt:Pd DOC tested the SCR catalyst activity was contaminated to a lesser extent, although the second 2Pt:Pd DOC still showed reduced $NO_x$ conversion activity compared with the blank control (no DOC, just a bare substrate). The authors concluded that the supplier of the second 2Pt:Pd DOC, which showed more moderate $NO_x$ conversion degradation, was more successful in stabilising the 70 gft$^{-3}$ Pt present with the 35 gft$^{-3}$ Pd. A Pd-only DOC at 150 gft$^{-3}$ demonstrated no impact on the downstream SCR relative to the blank control. Earlier work from the authors of SAE 2009-01-0627 was published in SAE paper no. 2008-01-2488.

EP 0622107 discloses a catalyst for purifying exhaust gas from diesel engines, wherein platinum catalyst is loaded on the upstream side of an exhaust gas flow, and palladium catalyst is loaded on the lower stream side of the exhaust gas flow. Hydrocarbons (HC) and soluble organic fraction (SOF) in the exhaust gas can be burned and removed by the platinum catalyst at low temperature. $SO_2$ is not oxidized at low temperature. The exhaust gas is heated to high temperature at the upstream portion. HC and SOF is effectively oxidized and removed by palladium catalyst at high temperature. $SO_2$ is not oxidized even at higher temperature. The disclosure claims that in the exhaust gas purifying catalyst HC and SOF can be removed at low temperature and $SO_2$ is not oxidized.

SUMMARY OF THE INVENTION

Vehicle manufacturers have begun asking the Applicant/Assignee for measures to solve the problem of volatilisation of relatively low levels PGMs from components upstream of SCR catalysts. It would be highly desirable to develop strategies to prevent this PGM movement onto a downstream SCR catalyst at high temperatures. The present inventors have developed a number of strategies for meeting this need.

The inventors have found that volatilisation of platinum from a PGM-containing catalyst comprising both platinum and palladium can occur under extreme temperature conditions when the weight ratio of Pt:Pd is greater than about 2:1. It is also believed that where the PGM consists of platinum, platinum volatilisation may also be observed. The present inventors have devised a catalysed substrate monolith comprising PGM for use in combination with a downstream SCR catalyst which avoids or reduces the problem of PGM, particularly Pt, migrating from an upstream relatively highly loaded Pt catalyst to a downstream SCR catalyst.

According to a first aspect, the invention provides a catalysed substrate monolith for use in treating exhaust gas emitted from a lean-burn internal combustion engine, which catalysed substrate monolith comprising a first washcoat coating and a second washcoat coating, wherein the first washcoat coating comprises a catalyst composition comprising at least one platinum group metal (PGM) and at least one support material, wherein at least one PGM in the first washcoat coating is liable to volatilise when the first washcoat is exposed to relatively extreme conditions including relatively high temperatures, wherein the second washcoat comprises at least one metal oxide for trapping volatilised PGM and wherein the second washcoat is oriented to contact exhaust gas that has contacted the first washcoat coating.

According to a second aspect, the invention provides an exhaust system for a lean-burn internal combustion engine, which system comprising a first catalysed substrate monolith according to the invention.

According to a further aspect, the invention provides a lean-burn internal combustion engine, particularly for a vehicle, comprising an exhaust system according to any preceding claim. In another aspect the invention provides a vehicle comprising an engine according to the invention.

According to another aspect, the invention provides a method of reducing or preventing a selective catalytic reduction (SCR) catalyst in an exhaust system of a lean-burn internal combustion engine from becoming poisoned with platinum group metal (PGM) which may volatilise from a catalyst composition comprising at least one PGM supported on at least one support material and disposed on a substrate monolith upstream of the SCR catalyst when the catalyst composition comprising PGM is exposed to relatively extreme conditions including relatively high temperatures, which method comprising trapping volatilised PGM in a washcoat coating comprising at least one metal oxide, which is disposed on the same substrate monolith as the catalyst composition comprising PGM.

A further aspect of the invention relates to the use of a metal oxide (i.e. at least one metal oxide) to reduce or prevent poisoning of a selective catalytic reduction (SCR) catalyst by a platinum group metal (PGM), typically in an exhaust system of a lean-burn internal combustion engine, wherein a second washcoat coating comprises the metal oxide and is oriented to contact exhaust gas that has contacted a first washcoat coating, and wherein the first washcoat coating comprises a catalyst composition comprising at least one platinum group metal (PGM) and at least one support material, and wherein a catalysed substrate monolith comprises the first washcoat coating and the second washcoat coating. In general, the metal oxide is for trapping volatilised PGM. Typically, at least one PGM in the first washcoat coating is liable to volatilise when the first washcoat is exposed to relatively extreme conditions including relatively high temperatures.

BRIEF DESCRIPTION OF THE DRAWINGS

In order that the invention may be more fully understood, reference is made to the following Examples by way of illustration only and with reference to the accompanying drawings.

DETAILED DESCRIPTION OF THE INVENTION

Figure 1:
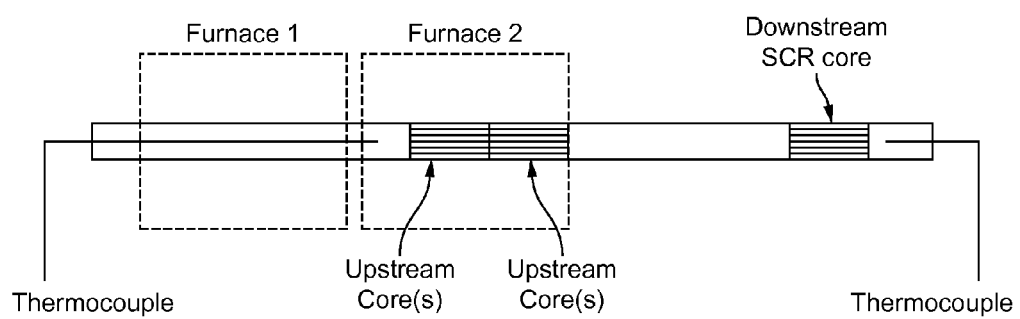
FIG. 1 is a schematic drawing of a laboratory reactor used for testing platinum contamination on an Fe/Beta zeolite SCR catalyst or a Cu/CHA zeolite SCR catalyst.

In general, the at least one PGM in the first washcoat coating comprises platinum. When at least one PGM in the first washcoat coating is platinum, then the platinum is the PGM liable to volatilise when the first washcoat coating is exposed to relatively extreme conditions including relatively high temperatures. The relatively extreme conditions including relatively high temperatures are, for example, temperatures of ≥700° C., preferably ≥800° C., or more preferably ≥900° C.

Typically, the PGM in the first washcoat coating comprises both platinum and palladium. The platinum and/or the palladium can be the PGM liable to volatilise when the first washcoat coating is exposed to relatively extreme conditions including relatively high temperatures. However, when both platinum and palladium are present, then normally platinum is more likely to be the PGM liable to volatilise when the first washcoat coating is exposed to relatively extreme conditions including relatively high temperatures.

It is possible for higher Pt:Pd weight ratios to be used in the first washcoat coating for the purposes of, e.g. generating $NO_2$ to promote downstream combustion of filtered particulate matter, because any PGM that may volatilise from the first washcoat coating in use may be trapped in the second washcoat coating. Typically, the first washcoat coating comprises a weight ratio of Pt:Pd of ≤10:1, e.g. 8:1, 6:1, 5:1 or 4:1.

When the catalysed substrate monolith is disposed immediately upstream of a SCR catalyst (i.e. without any intervening substrate monolith between the catalysed substrate monolith of the present invention and the SCR catalyst), it is preferred that the weight ratio of Pt:Pd is ≤2, preferably in the first washcoat coating or in the catalysed substrate monolith as whole (i.e. overall). Where the at least one PGM in the first washcoat coating comprises both platinum and palladium, preferably the weight ratio of Pt:Pd is ≤2, such as ≤1.5:1, e.g. about 1:1. The significance of this feature is shown in the Examples: the inventors have found that the preferred Pt:Pd weight ratios volatilise less, by empiric testing, than a similar catalyst having a Pt:Pd weight ratio of 4:1. In layered catalyst arrangements, it is preferred that an outer layer has a Pt:Pd weight ratio of ≤2, or optionally that the overall Pt:Pd weight ratio of all layers combined is ≤2.

Typically, the weight ratio of Pt:Pd in the first washcoat coating or overall is ≥35:65 (e.g. ≥7:13). It is preferred that the weight ratio Pt:Pd is ≥40:60 (e.g. ≥2:3), more preferably ≥45:55 (e.g. ≥9:11), particularly ≥50:50 (e.g. ≥1:1), such as ≥1.25:1, and still more preferably ≥1.5:1 (e.g. ≥1.6:1). The weight ratio of Pt:Pd, either in the first washcoat coating or overall, is typically 10:1 to 7:13. It is preferred that the weight ratio of Pt:Pd is 8:1 to 2:3, more preferably 6:1 to 9:11, even more preferably 5:1 to 1:1, such as 4:1 to 1.25:1, and still more preferably 2:1 to 1.25:1 (e.g. 2:1 to 1.6:1).

Generally, the total amount of the platinum group metal (PGM) (e.g. the total amount of Pt and/or Pd) is 1 to 500 gft$^{-3}$. Preferably, the total amount of the PGM is 5 to 400 g ft$^{-3}$, more preferably 10 to 300 g ft$^{-3}$, still more preferably, 25 to 250 g ft$^{-3}$, and even more preferably 35 to 200 g ft$^{-3}$.

In general, when the catalysed substrate monolith of the present invention comprises platinum, then the platinum is not doped with bismuth and/or manganese. More preferably, the catalyst substrate monolith does not comprise bismuth and/or manganese.

In general, the metal oxide (i.e. the at least one metal oxide support of the second washcoat coating) comprises a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof. Suitable stabilisers include one or more of silica and rare earth metals.

The metal oxide of the second washcoat coating and the at least one support material of the first washcoat coating may be the same or different. It is preferred that the metal oxide of the second washcoat coating and the at least one support material of the first washcoat coating are different.

The second washcoat coating may, typically, comprise the metal oxide in a total amount of 0.1 to 5 g in$^{-3}$, preferably 0.2 to 4 g in$^{-3}$ (e.g. 0.5 to 3.5 g in$^{-3}$), more preferably 1 to 2.5 g in$^{-3}$.

The inventors have found that particularly alumina and ceria-containing metal oxides per se are capable of trapping volatilised PGMs, particularly ceria, which has a particular affinity for Pt. It is preferred that the metal oxide of the second washcoat coating is selected from the group consisting of optionally stabilised alumina, ceria and an optionally stabilised ceria-zirconia mixed oxide. More preferably, the metal oxide is selected from the group consisting of optionally stabilised alumina and an optionally stabilised ceria-zirconia mixed oxide.

In one embodiment, the second washcoat coating does not comprise palladium and platinum. More preferably, the second washcoat coating does not comprise a platinum group metal (PGM).

In other embodiments, the second washcoat coating may further comprise a catalyst composition comprising at least one metal selected from the group consisting of palladium, silver, gold and combinations of any two or more thereof, wherein the at least one metal oxide supports the at least one metal. It is preferred that the second washcoat comprises a supported combination of palladium and gold e.g. as an alloy, as described in Applicant/Assignee's WO 2009/136206.

When the second washcoat coating comprises a catalyst composition comprising palladium and gold (e.g. as an alloy), then typically the palladium and gold are not doped with bismuth and/or manganese. More preferably, the second washcoat coating does not comprise bismuth and/or manganese.

Typically, the total amount of the at least one metal in the second washcoat coating is from 10 to 350 g ft$^{-3}$. It is preferred that the total amount is 20 to 300 g ft$^{-3}$, more preferably 30 to 250 g ft$^{-3}$, still more preferably, 45 to 200 g ft$^{-3}$, and even more preferably 50 to 175 g ft$^{-3}$.

When the second washcoat coating comprises a catalyst composition comprising palladium, then preferably the second washcoat coating does not comprise platinum.

In general, the second washcoat coating is substantially devoid of (i.e. does not comprise) copper and/or rhodium.

The only PGM present in the second washcoat coating is generally palladium. However, in a particular embodiment, the second washcoat coating comprises platinum and palladium. Typically, the weight ratio of Pt:Pd in the second washcoat coating is lower than the weight ratio of Pt:Pd in the first washcoat coating (i.e. the relative amount of Pt to Pd in the second washcoat coating is lower than the relative amount of Pt to Pd in the first washcoat coating). The present inventors have found that palladium, or a Pt/Pd catalyst having a relatively high Pd content can act to trap volatilised Pt.

The first washcoat coating comprises a catalyst composition comprising at least one platinum group metal (PGM) and at least one support material for the at least one PGM. The catalyst is typically applied to the substrate monolith as a washcoat slurry comprising at least one PGM salt and one or more support materials in the finished catalyst coating, before the coated filter is dried and then calcined. The one or more support materials may be referred to as a "washcoat component". It is also possible for at least one PGM to be pre-fixed to one or more support materials prior to it being slurried, or for a combination of support material particles to which PGM is pre-fixed to be slurried in a solution of PGM salt.

By at least one "support material" herein, we mean a metal oxide selected from the group consisting of optionally stabilised alumina, amorphous silica-alumina, optionally stabilised zirconia, ceria, titania, an optionally stabilised ceria-zirconia mixed oxide, a molecular sieve and mixtures or combinations of any two or more thereof.

Typically, the at least one support material of the first washcoat coating is selected from the group consisting of optionally stabilised alumina, amorphous silica-alumina, optionally stabilised zirconia, ceria, titania, an optionally stabilised ceria-zirconia mixed oxide, a molecular sieve and mixtures or combinations of any two or more thereof. It is preferred that the first washcoat coating comprises at least one support material selected from the group consisting of optionally stabilised alumina, amorphous silica-alumina, ceria and mixtures or combinations of any two or more thereof.

The at least one support material may include one or more molecular sieve, e.g. an aluminosilicate zeolite. The primary duty of the molecular sieve in the PGM catalyst for use in the present invention is for improving hydrocarbon conversion over a duty cycle by storing hydrocarbon following cold start or during cold phases of a duty cycle and releasing stored hydrocarbon at higher temperatures when associated platinum group metal catalyst components are more active for HC conversion. See for example Applicant/Assignee's EP 0830201. Molecular sieves are typically used in catalyst compositions according to the invention for light-duty diesel vehicles, whereas they are rarely used in catalyst compositions for heavy duty diesel applications because the exhaust gas temperatures in heavy duty diesel engines mean that hydrocarbon trapping functionality is generally not required.

However, molecular sieves such as aluminosilicate zeolites are not particularly good supports for platinum group metals because they are mainly silica, particularly relatively higher silica-to-alumina molecular sieves, which are favoured for their increased thermal durability: they may thermally degrade during ageing so that a structure of the molecular sieve may collapse and/or the PGM may sinter, giving lower dispersion and consequently lower HC and/or CO conversion activity. Accordingly, it is preferred that the first washcoat coating and/or the second washcoat coating comprise a molecular sieve at ≤30% by weight (such as ≤25% by weight, ≤20% by weight e.g. ≤15% by weight) of the individual washcoat coating layer. The remaining at least one support material of the first washcoat coating and/or the second washcoat coating may comprise a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof.

Preferred molecular sieves for use as support materials/hydrocarbon adsorbers are medium pore zeolites, preferably aluminosilicate zeolites, i.e. those having a maximum ring size of eight tetrahedral atoms, and large pore zeolites (maximum of ten tetrahedral atoms) preferably aluminosilicate zeolites, include natural or synthetic zeolites such as faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite or a beta zeolite, preferably ZSM-5, beta and Y zeolites. Preferred zeolite adsorbent materials have a high silica to alumina ratio, for improved hydrothermal stability. The zeolite may have a silica/alumina molar ratio of from at least about 25/1, preferably at least about 50/1, with useful ranges of from about 25/1 to 1000/1, 50/1 to 500/1 as well as about 25/1 to 100/1, 25/1 to 300/1, from about 100/1 to 250/1.

The first washcoat coating can be disposed in a range of configurations relative to the second washcoat coating. The first washcoat coating may be disposed in a first washcoat zone of the substrate monolith and the second washcoat may be disposed in a second washcoat zone of the substrate monolith, wherein there is substantially no overlap between the first washcoat zone and the second washcoat zone (e.g. there is no overlap between the first washcoat coating and the second washcoat coating). Generally, the first washcoat zone is disposed at an inlet end of the catalysed substrate monolith and the second washcoat zone is disposed at an outlet end of the catalysed substrate monolith.

Alternatively, or in addition, the second washcoat coating may be disposed in a layer above the first washcoat coating. Of course, when the first washcoat coating and the second washcoat coating are disposed on a filter, care has to be taken with any layering arrangement so that the "second washcoat coating is oriented to contact exhaust gas that has contacted the first washcoat coating" feature of the invention is met, e.g. it may be necessary to reverse the orientation of the first and second washcoat coating layers applied to outlet channels of a wall-flow filter.

The substrate monolith for use in the invention can be a flow-through substrate monolith or a filtering substrate monolith. The second washcoat coating is generally oriented to contact exhaust gas that has contacted the first washcoat. This is to allow the first washcoat coating to come into contact with the exhaust gas first. The exhaust gas and any volatilised PGM from the first washcoat coating is then contacted with the second washcoat coating that includes a metal oxide for trapping the volatilised PGM.

A filtering substrate monolith typically has inlet surfaces and outlet surfaces, wherein the inlet surfaces are separated from the outlet surfaces by a porous structure. It is preferred that the filtering substrate monolith is a wall-flow filter, i.e. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternatingly separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Catalysed filters, preferably wall-flow filters, can be coated using the method disclosed in Applicant/Assignee's WO 2011/080525. That is, a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition may be coated on filter channels from a first end, following which the coated filter can be dried.

Methods of making catalysed substrate monoliths, including single layer washcoat coatings and dual layered arrangements (one washcoat coating layer above another washcoat coating layer) are known in the art and include Applicant/Assignee's WO 99/47260, i.e. comprising the steps of (a) locating a containment means on top, first end of a substrate monolith, (b) dosing a pre-determined quantity of a first washcoat coating component into said containment means, either in the order (a) then (b) or (b) then (a), and (c) by applying pressure or vacuum, drawing said first washcoat coating component into at least a portion of the substrate monolith, and retaining substantially all of said quantity within the substrate monolith. In a first step a coating from a first end of application can be dried and the dried substrate monolith can be flipped through 180 degrees and the same procedure can be done to a top, second end of the substrate monolith, with substantially no overlap in layers between applications from the first and second ends of the substrate monolith. The resulting coating product is then dried, and then calcined. The process is repeated with a second washcoat coating component, to provide a catalysed (bi-layered) substrate monolith according to the invention.

Use of such a method can be controlled using, e.g. vacuum strength, vacuum duration, washcoat viscosity, washcoat solids, coating particle or agglomerate size and surface tension so that catalyst is coated predominantly on the inlet surfaces but also optionally within the porous structure but near to the inlet surfaces. Alternatively, the washcoat components may be milled to a size, e.g. D90≤5 µm, so that they "permeate" the porous structure of the filter (see WO 2005/016497).

It is preferred that the catalysed substrate monolith comprises a filtering substrate monolith (e.g. the catalysed substrate monolith is a catalysed filtering substrate monolith) and a zoned arrangement of the first washcoat coating and the second washcoat coating. More preferably, a first washcoat zone comprises inlet surfaces of the filtering substrate monolith and the second washcoat zone comprises outlet surfaces of the filtering substrate monolith. In this context, the inlet surfaces generally refer to the walls of the channels of the filtering substrate monolith into which exhaust gas enters, and the outlet surfaces generally refer to the walls of the channels of the filtering substrate monolith through which the exhaust gas leaves. Thus, for example, the porous structure or walls separating the inlet and outlet surfaces defines a transition between the first washcoat zone and the second washcoat zone.

The first washcoat coating can comprise an oxidation catalyst or a $NO_x$ adsorber catalyst (NAC), as described in the background of the invention hereinabove. A NAC contains significant quantities of alkaline earth metals and/or alkali metals relative to an oxidation catalyst. The NAC typically also includes ceria or a ceria-containing mixed oxide, e.g. a mixed oxide of cerium and zirconium, which mixed oxide optionally further including one or more additional lanthanide or rare earth elements.

In addition to the first washcoat coating and the second washcoat coating, the catalysed substrate monolith of the invention may further comprise additional washcoat coatings. However, it is preferred that the catalysed substrate monolith of the invention has only two washcoat coatings, the first washcoat coating and the second washcoat coating. Thus, the catalysed substrate monolith consists of a first washcoat coating and a second washcoat coating.

The invention also relates to an exhaust system. The exhaust system preferably further comprises a second catalysed substrate monolith comprising a selective catalytic reduction (SCR) catalyst, which second catalysed substrate monolith is disposed downstream from the first catalysed substrate monolith. An optionally catalysed filtering substrate monolith (i.e. a third, optionally catalysed, substrate monolith) can be disposed downstream from the second catalysed substrate monolith (e.g. an exhaust system in a DOC/SCR/CSF arrangement discussed in connection with the background to the invention hereinabove). The filtering substrate monolith (i.e. the third, optionally catalysed, substrate monolith) is preferably a wall-flow filter. Where catalysed, the catalyst for use in connection with the filtering substrate monolith is an oxidation catalyst, but in alternative embodiments it can be a NAC composition. Alternatively, the filtering substrate monolith can be uncatalysed.

Typically, the exhaust system of the invention comprises an injector for injecting a nitrogenous reductant into exhaust gas between the first catalysed substrate monolith and the second catalysed substrate monolith. Alternatively, (i.e. without means for injecting a nitrogenous reductant, such as ammonia or a precursor thereof, such as urea, is disposed between the first catalysed substrate monolith and the second catalysed substrate monolith), or in addition to the means for injecting a nitrogenous reductant (e.g. ammonia or a precursor thereof, such as urea), engine management means may be provided for enriching exhaust gas such that ammonia gas is generated in situ by reduction of $NO_x$ on the catalyst composition of the first washcoat coating and/or a substrate monolith comprising a DOC or NAC disposed upstream of the first substrate monolith or downstream of the first substrate monolith. Where the substrate monolith comprising the DOC or the NAC is disposed downstream of the filter, preferably it is disposed upstream of the means for injecting ammonia or a precursor thereof.

Nitrogenous reductants and precursors thereof for use in the present invention include any of those mentioned hereinabove in connection with the background section. Thus, for example, the nitrogenous reductant is preferably ammonia or urea.

In combination with an appropriately designed and managed diesel compression ignition engine, enriched exhaust gas, i.e. exhaust gas containing increased quantities of carbon monoxide and hydrocarbon relative to normal lean running mode, contacts the NAC. Components within a NAC such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+2NH_3+5H_2O$, $NH_3$ can be generated in situ and stored for $NO_x$ reduction on the downstream SCR catalyst.

When the first catalysed substrate monolith is a filtering substrate monolith (e.g. a catalysed wall-flow filter), the exhaust system preferably further comprises a third catalysed substrate monolith, wherein the third catalysed substrate monolith is a flow-through substrate monolith comprising an oxidation catalyst, e.g. a DOC or a NAC, which third catalysed substrate monolith is disposed upstream of the first catalysed substrate monolith.

The second catalysed substrate monolith typically comprises a catalyst for selectively catalysing the reduction of oxides of nitrogen to dinitrogen with a nitrogenous reductant, also known as a selective catalytic reduction (SCR) catalyst. The SCR catalyst may be coated as a coating onto a substrate monolith, such as described hereinabove. Alternatively, the SCR catalyst may be provided as an extrudate (also known as a "catalyst body"), i.e. the catalyst is mixed with components of the substrate monolith structure, which are both extruded, so the catalyst is part of the walls of the substrate monolith.

The SCR catalyst of the second substrate monolith typically comprises a filtering substrate monolith or a flow-through substrate monolith. It is also possible to make a wall-flow filter from an extruded SCR catalyst (see Applicant/Assignee's WO 2009/093071 and WO 2011/092521). SCR catalysts can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. Non-zeolite catalyst can also include tungsten oxide, e.g. $V_2O_5/WO_3/TiO_2$. Preferred metals of particular interest are selected from the group consisting of Ce, Fe and Cu. Molecular sieves can be ion-exchanged with the above metals.

It is preferred that the at least one molecular sieve, is an aluminosilicate zeolite or a SAPO. The at least one molecular sieve can be a small, a medium or a large pore molecular sieve, for example. By "small pore molecular sieve" herein we mean a molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example Applicant/Assignee's WO 2008/132452. Molecular sieves for use in SCR catalysts according to the invention include one or more metals incorporated into a framework of the molecular sieve e.g. Fe "in-framework" Beta and Cu "in-framework" CHA.

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1, with CHA molecular sieves, e.g. aluminosilicate CHA, currently preferred, particularly in combination with Cu as promoter, e.g. ion-exchanged.

The present invention also relates to a lean-burn internal combustion engine. The lean-burn internal combustion engine can be a positive ignition, e.g. a spark ignition, engine that typically run on gasoline fuel or blends of gasoline fuel and other components such as ethanol, but is preferably a compression ignition, e.g. a diesel-type engine. Lean-burn internal combustion engines include homogenous charge compression ignition (HCCI) engines, powered either by gasoline etc. fuel or diesel fuel.

Figure 6A:
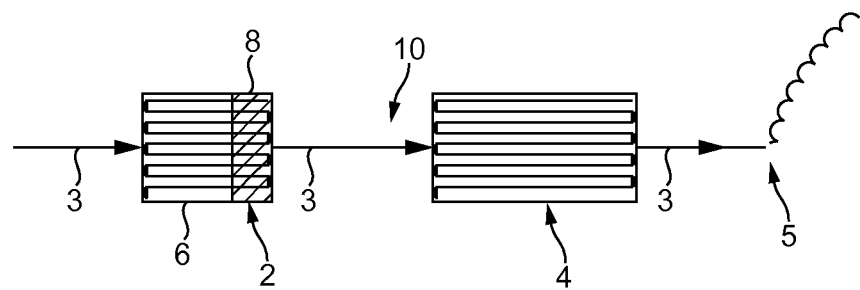
FIGS. 6A and 6B are schematic drawings of exhaust system embodiments including catalysed substrate monoliths according to the invention.

An exhaust system of the present invention is shown in FIG. 6A. Exhaust system 10 comprises, in serial arrangement from upstream to downstream, a catalysed wall-flow filter 2; and a wall-flow filter substrate monolith 4 coated with a Cu/CHA SCR catalyst. Each substrate monolith 2, 4 is disposed in a metal container or "can" including coned diffusers and they are linked by a series of conduits 3 of smaller cross sectional area than a cross sectional area of any of substrate monoliths 2, 4. The coned diffusers act to spread the flow of exhaust gas entering a housing of a "canned" substrate monolith so that the exhaust gas as a whole is directed across substantially the whole front "face" of each substrate monolith. Exhaust gas exiting substrate monolith 4 is emitted to atmosphere at "tail pipe" 5.

Catalysed wall-flow filter 2 is coated with a $NO_x$ absorber catalyst (NAC) composition in a zone 6 on inlet channels thereof and palladium supported on particulate alumina in a zone 8 on outlet channels thereof. In combination with an appropriately designed and managed diesel compression ignition engine (upstream of substrate monolith 2, not shown), enriched exhaust gas, i.e. exhaust gas containing increased quantities of carbon monoxide and hydrocarbon relative to normal lean running mode, contacts the NAC. Components within a NAC such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+2NH_3+5H_2O$, $NH_3$ can be generated in situ and stored for $NO_x$ reduction on the downstream SCR catalyst.

Figure 6B:
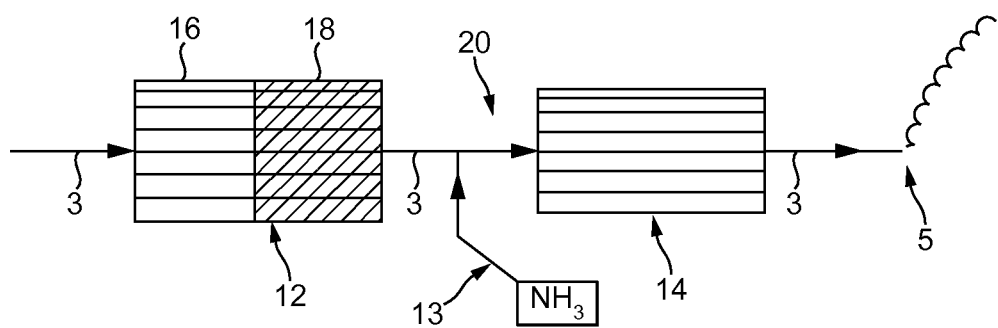

FIG. 6B shows an alternative embodiment of an exhaust system 20 according to the present invention comprising, in serial arrangement from upstream to downstream, a catalysed flow-through substrate monolith 12; a source of ammonia 13 comprising an injector for an ammonia precursor, urea; and a flow-through substrate monolith 14 coated with a Fe/Beta SCR catalyst. Each substrate monolith 12, 14 is disposed in a metal container or "can" including coned diffusers and they are linked by a series of conduits 3 of smaller cross sectional area than a cross sectional area of any of substrate monoliths 12, 14. Exhaust gas exiting substrate monolith 14 is emitted to atmosphere at "tail pipe" 5.

Catalysed flow-through substrate monolith 12 comprises a first zone 16 defined in part by an upstream end thereof coated with a 4:1 Pt:Pd weight ratio catalyst wherein the Pt and Pd are supported on a support material; and a second zone 18 of about 50% of a total length of the flow-through substrate monolith with substantially no overlap with first zone 16, which second zone 18 comprising a two-layered arrangement wherein a first (or bottom) layer comprises platinum supported on alumina and a second (or top) layer comprising palladium supported on alumina. The catalysed flow-through substrate monolith is designed for the purpose of promoting reaction (1) and thereby reaction (6) on the downstream SCR catalyst.

EXAMPLES

Example 1

Preparation of Substrate Monolith Coated with 5 Wt % Fe/Beta Zeolite

Commercially available Beta zeolite was added to an aqueous solution of $Fe(NO_3)_3$ with stirring. After mixing, binders and rheology modifiers were added to form a washcoat composition.

A 400 cells per square inch (cpsi) cordierite flow-through substrate monolith was coated with an aqueous slurry of the 5 wt % Fe/Beta zeolite sample using the method disclosed in Applicant/Assignee's WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long was cut from the finished article.

Comparative Example 2

Preparation of Pt-Only Catalysed Wall-Flow Filter

A washcoat composition comprising a mixture of alumina particles milled to a relatively high particle size distribution, platinum nitrate, binders and rheology modifiers in deionised water was prepared. An aluminium titanate wall-flow filter was coated with the catalyst composition at a washcoat loading of 0.2 g/in$^{-3}$ to a final total Pt loading of 5 g/ft$^{-3}$ using the method and apparatus disclosed in the Applicant/Assignee's WO 2011/080525, wherein channels at a first end intended for orientation to an upstream side were coated for 75% of their total length with a washcoat comprising platinum nitrate and particulate alumina from the intended upstream end thereof; and channels at an opposite end and intended to be oriented to a downstream side are coated for 25% of their total length with the same washcoat as the inlet channels. That is, the method comprised the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition was coated on filter channels from a first end, following which the coated filter was dried. The dried filter coated from the first end was then turned and the method was repeated to coat the same catalyst to filter channels from the second end, followed by drying and calcining.

A core of 1 inch (2.54 cm) diameter×3 inches (7.62 cm) long was cut from the finished article. The resulting part is described as "fresh", i.e. unaged.

Example 3

Preparation of Pt-Inlet/Pd-Outlet Containing Catalysed Wall-Flow Filter

A coated filter was prepared using the same method as in Comparative Example 2, except in that 100% of the total channel length of channels intended for orientation towards the inlet side of gas contact was coated with a washcoat containing platinum nitrate and alumina before the coated filter was dried; and 35% of the total length of channels of the Pt-coated filter intended for orientation towards the outlet side were coated with a washcoat containing palladium nitrate and alumina. The resulting fully coated filter was then dried, then calcined. The total loading of Pt on the coated filter was 5 gft$^{-3}$ and the total loading of Pd on the coated filter was 1.75 gft$^{-3}$.

A core of 1 inch (2.54 cm) diameter×3 inches long was cut from the finished article. The resulting part is described as "fresh", i.e. unaged.

Example 4

Preparation of Pt-Inlet/Al$_2$O$_3$-Outlet Containing Catalysed Wall-Flow Filter A coated filter was prepared using the same method as Example 3, except in that 35% of the total length of channels intended for orientation towards the outlet side were coated with a washcoat containing alumina only. The resulting coated filter was then dried, then calcined. The total loading of Pt on inlet channels of the coated filter was 5 gft$^{-3}$.

A core of 1 inch (2.54 cm) diameter×3 inches long was cut from the finished article. The resulting part is described as "fresh", i.e. unaged.

Example 5

Preparation of Pt-Inlet/Single Layer Pt:Pd-Outlet Containing Catalysed Wall-Flow Filter A coated filter was prepared using the same method as in Comparative Example 2, except in that the washcoat applied to the outlet channels of the filter included palladium nitrate in addition to the platinum nitrate. The washcoat loading in the inlet and outlet channels was conducted in such a way as to arrive at a 5 g/ft$^{-3}$ Pt, 1.25 g/ft$^{-3}$ Pd loading on both the inlet surfaces and the outlet surfaces, i.e. a total PGM loading of 6.25 g/ft$^{-3}$.

A core of 1 inch (2.54 cm) diameter×3 inches long was cut from the finished article. The resulting part is described as "fresh", i.e. unaged.

Example 6

Preparation of Pt-Inlet/Layered Pt/Pd-Outlet Containing Catalysed Wall Flow Filter A coated filter was prepared using the same method as in Comparative Example 2, except in that two layers of washcoat were applied to the 25% total zone length of the outlet channels. In a first (or bottom) layer, the washcoat contained platinum nitrate and alumina. The coated filter was then dried and calcined before a second (or top) layer washcoat was applied which contained palladium nitrate and alumina. The washcoat loading in the inlet and outlet channels was conducted in such a way as to arrive at a total combined loading on the inlet channels and the outlet channels of 5 g/ft$^{-3}$ Pt, 1.25 g/ft$^{-3}$ Pd loading, i.e. a total PGM loading of 6.25 g/ft$^{-3}$.

A core of 1 inch (2.54 cm) diameter×3 inches long was cut from the finished article. The resulting part is described as "fresh", i.e. unaged.

Example 7

Preparation of 1:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^{-3}$ Pt, 5 g/ft$^{-3}$ Pd loading on both the inlet surfaces and the outlet surfaces, i.e. a total PGM loading of 10 g/ft$^{-3}$. A core of 1 inch (2.54 cm) diameter×3 inches long was cut from the finished article. The resulting part is described as "fresh", i.e. unaged.

Example 8

Preparation of 5:1 Weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^{-3}$ Pt, 1 g/ft$^{-3}$ Pd loading on both the inlet surfaces and the outlet surfaces, i.e. a total PGM loading of 6 g/ft$^{-3}$.

A core of 1 inch (2.54 cm) diameter×3 inches long was cut from the finished article. The resulting part is described as "fresh", i.e. unaged.

Example 9

System Tests

The tests were performed on a first synthetic catalyst activity test (SCAT) laboratory reactor illustrated in FIG. 1, in which a fresh core of the coated Fe/Beta zeolite SCR catalyst of Example 1 is disposed in a conduit downstream of a core of either the catalysed wall-flow filter of Comparative Example 2 or of Example 3, 4, 5, 6, 7 or 8. A synthetic gas mixture was passed through the conduit at a catalyst swept volume of 30.000 hr$^{-1}$. A furnace was used to heat (or "age") the catalysed wall-flow filter sample at a steady-state temperature at a filter inlet temperature of 900° C. for 60 minutes, during which the inlet SCR catalyst temperature was 300° C. An air (heat exchanger) or water cooling mechanism was used to effect the temperature drop between the filter and the SCR catalyst. The gas mixture during the ageing was 10% $O_2$, 6% $H_2O$, 6% $CO_2$, 100 ppm CO, 400 ppm NO, 100 ppm HC as Cl, balance $N_2$.

Following ageing, the aged SCR catalysts were removed from the first SCAT reactor and inserted into a second SCAT reactor specifically to test NH3-SCR activity of the aged samples. The aged SCR catalysts were then tested for SCR activity at 150, 200, 250, 300, 350, 450, 550 and 650° C. using a synthetic gas mixture ($O_2$=14%; $H_2O$=7%; $CO_2$=5%; $NH_3$=250 ppm; NO=250 ppm; $NO_2$=0 ppm; $N_2$=balance) and the resulting $NO_x$ conversion for Examples 3, 5 and 6 were plotted against temperature for each temperature data point in FIG. 2 against fresh SCR catalyst activity and against an SCR catalyst aged behind Comparative Example 2. The graph shown in FIG. 3 plots the resulting $NO_x$ conversion for Examples 4 and 7 using the same comparisons. This plot essentially measures competition between reaction (9) and reaction (5) and thus how much reaction (9) affects the $NO_x$ conversion by consumption of the available $NH_3$ needed for the SCR reaction (reaction (5)).

Figure 2:
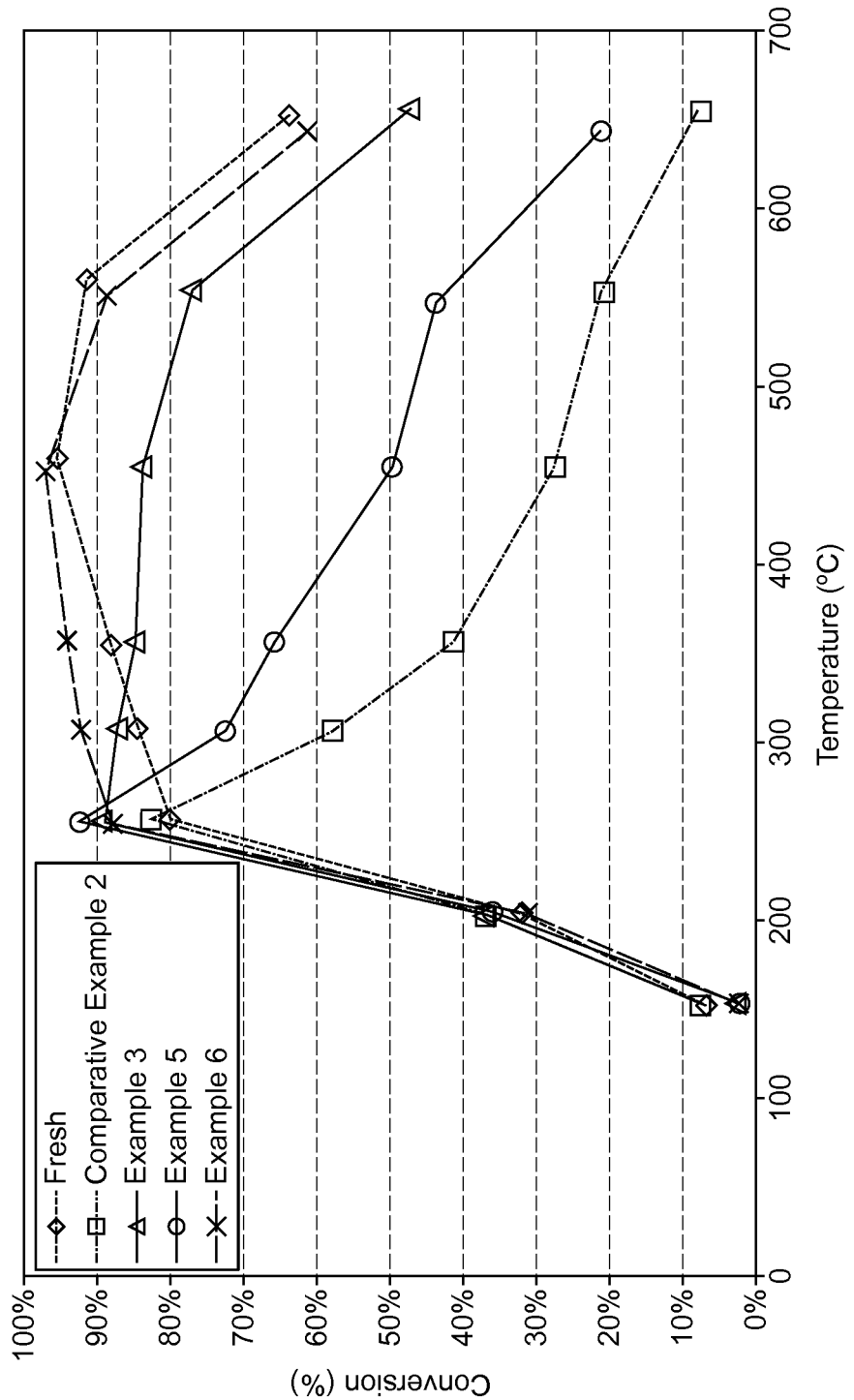
FIG. 2 is a graph comparing the $NO_x$ conversion activity as a function of temperature of four aged SCR catalyst cores each of which has been aged in a laboratory-scale exhaust system configuration containing core samples of Examples 3, 5 and 6 of the invention or Comparative Example 2. The results of the aged SCR activity is plotted against activity of a fresh, i.e. un-aged SCR catalyst.
Figure 3:
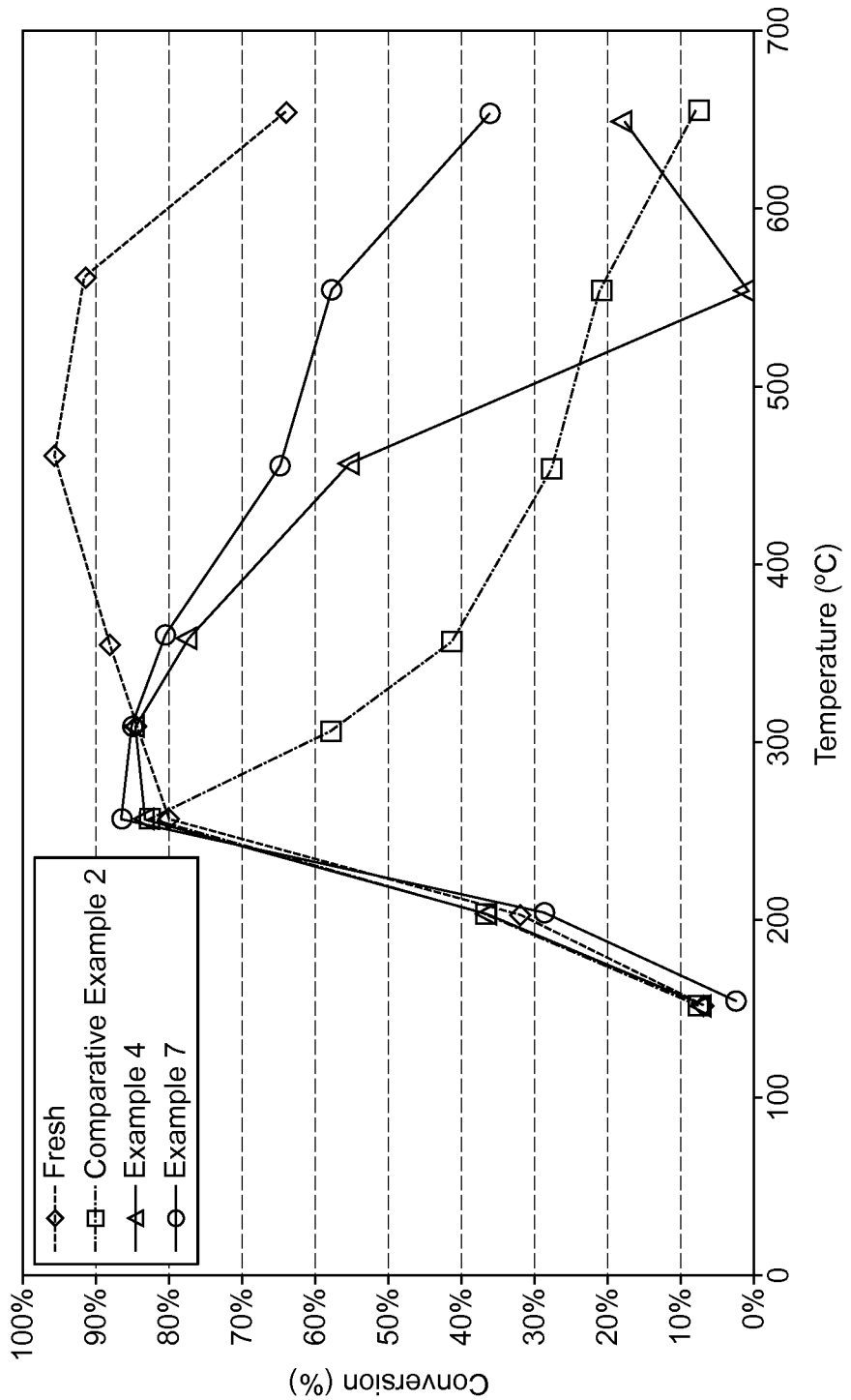
FIG. 3 is a graph comparing the $NO_x$ conversion activity as a function of temperature of a further three aged SCR catalyst cores each of which has been aged in a laboratory-scale exhaust system configuration containing core samples of Examples 4 and 7 of the invention or Comparative Example 2. The results of the aged SCR activity is plotted against activity of a fresh, i.e. un-aged SCR catalyst.

The results are shown in FIGS. 2 and 3. It can be seen that the SCR catalysts for use in the exhaust system according to the present invention retain more activity than the SCR catalyst in Comparative Example 2, although they retain less SCR activity than a fresh catalyst. The inventors interpret this result as showing that the loss in SCR activity is caused in part by the deposition of low levels of Pt from the upstream catalysed wall-flow filter on the downstream SCR catalyst. Substantially no loss in activity was seen between a fresh Fe/Beta catalyst and a Fe/Beta catalyst aged at 300° C. for 1 hour without any catalyst present upstream (results not shown).

Example 10

Preparation of Substrate Monolith Coated with 3 Wt % Cu/CHA Zeolite

Commercially available aluminosilicate CHA zeolite was added to an aqueous solution of $Cu(NO_3)_2$ with stirring. The slurry was filtered, then washed and dried. The procedure can be repeated to achieve a desired metal loading. The final product was calcined. After mixing, binders and rheology modifiers were added to form a washcoat composition.

A 400 cpsi cordierite flow-through substrate monolith was coated with an aqueous slurry of the 3 wt % Cu/CHA zeolite sample using the method disclosed in Applicant/Assignee's WO 99/47260 described in Example 1 hereinabove. The coated substrate monolith was aged in a furnace in air at 500° C. for 5 hours. A core of 1 inch (2.54 cm) diameter×3 inches long (7.62 cm) was cut from the finished article.

Example 11

Further Pt:Pd Weight Ratio Studies

Two diesel oxidation catalysts were prepared as follows:
Diesel Oxidation Catalyst A A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the method of Example 1 hereinabove. The dosed part was dried and then calcined at 500° C. The total platinum group metal loading in the washcoat coating was 60 gft$^{-3}$ and the total Pt:Pd weight ratio was 4:1. A core of 1 inch (2.54 cm) diameter×3 inches (7.62 cm) long was cut from the finished article. The resulting part may be described as "fresh", i.e. unaged.

Diesel Oxidation Catalyst B

A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the same method as used for DOC A. The dosed part was dried and then calcined at 500° C. The total PGM loading in the single layer DOC was 120 g/ft$^{-3}$ and the Pt:Pd weight ratio was 2:1. A core of 1 inch (2.54 cm) diameter×3 inches (7.62 cm) long was cut from the finished article. The resulting part may be described as "fresh", i.e. unaged.

Both catalysts were tested according the protocols set out in Example 12. The results are set out in FIG. 5 with reference to a control (aged SCR catalyst that has not been further aged downstream of either DOC A or DOC B).

Example 12

System Tests

The tests were performed on a first synthetic catalyst activity test (SCAT) laboratory reactor illustrated in FIG. 1, in which an aged core of the coated Cu/CHA zeolite SCR catalyst of Example 10 was disposed in a conduit downstream of a core of either the Diesel Oxidation Catalyst (DOC) A or B (according to Example 11). A synthetic gas mixture was passed through the conduit at a rate of 6 liters per minute. A furnace was used to heat (or "age") the DOC samples at a steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could also be used as appropriate. Temperatures were determined using appropriately positioned thermocouples ($T_1$ and $T_2$). The gas mixture used during the ageing was 40% air, 50% $N_2$, 10% $H_2O$.

Following the DOC ageing, the SCR catalysts were removed from the first SCAT reactor and inserted into a second SCAT reactor specifically to test $NH_3$-SCR activity of the aged samples. The SCR catalysts were then tested for SCR activity at 500° C. using a synthetic gas mixture ($O_2$=10%; $H_2O$=5%; $CO_2$=7.5%; CO=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible $NO_x$ conversion available was 80%) and the resulting $NO_x$ conversion was plotted against temperature on the accompanying bar chart in FIG. 5. This plot essentially measures competition between reaction (9) and reaction (5) and thus how much reaction (9) affects the $NO_x$ conversion by consumption of the available $NH_3$ needed for the SCR reaction (reaction (5)).

Pt:Pd weight Ratio Study—Conclusions

Figure 4:
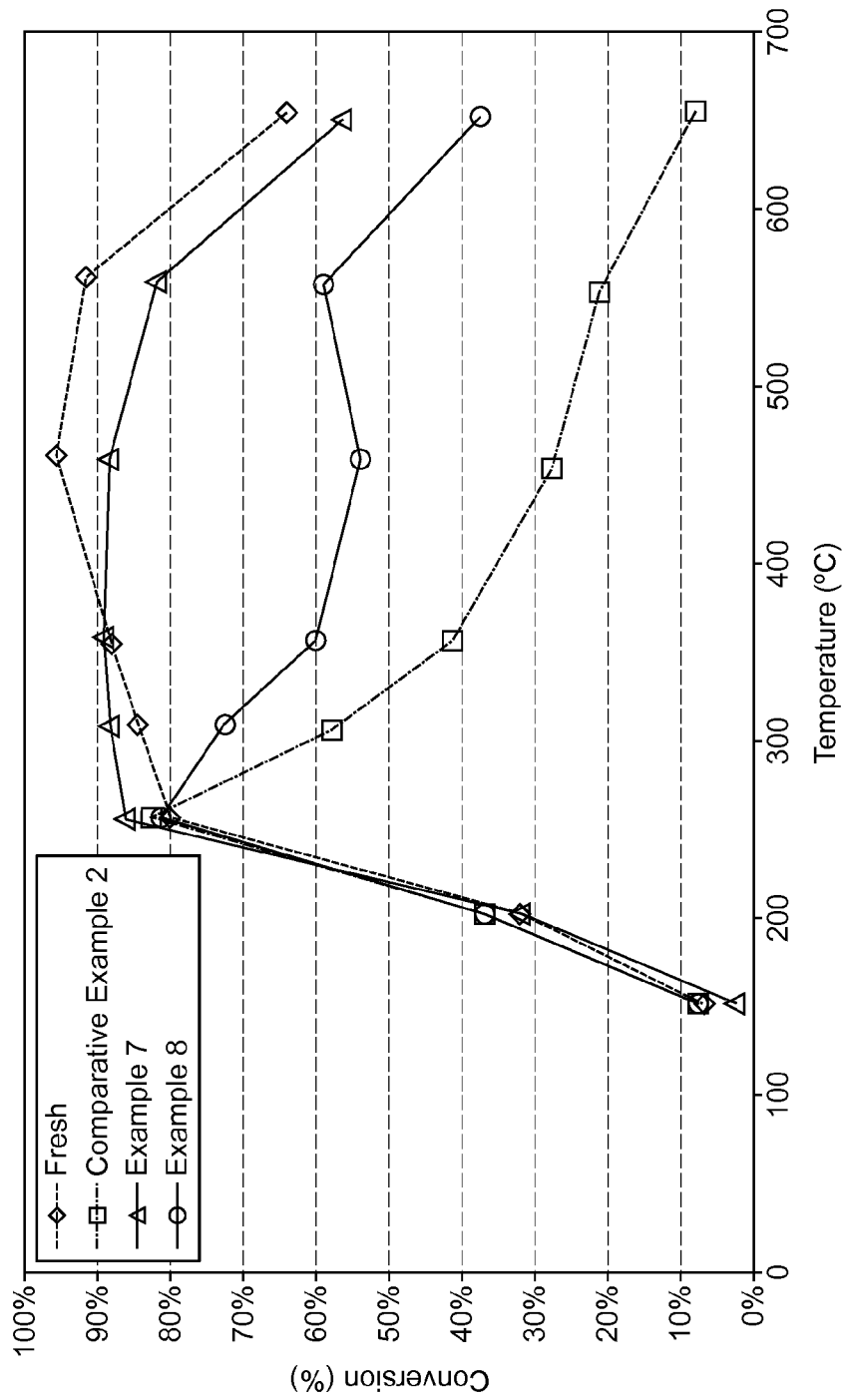
FIG. 4 is a graph comparing the $NO_x$ conversion activity as a function of temperature of three aged SCR catalyst cores each of which has been aged in a laboratory-scale exhaust system configuration containing a catalysed wall-flow filter disposed upstream of the Fe/Beta zeolite SCR catalyst, one system comprising a filter coated on both inlet and outlet channels with Pt:Pd in a 1:1 weight ratio (Example 7); a second system comprising a filter coated on both inlet and outlet channels with a Pt:Pd in a 5:1 weight ratio (Example 8); and a third, comparative system comprising a filter coated on both inlet and outlet channels with a Pt-only catalyst. The results of the aged SCR activity is plotted against activity of a fresh, i.e. un-aged SCR catalyst.
Figure 5:
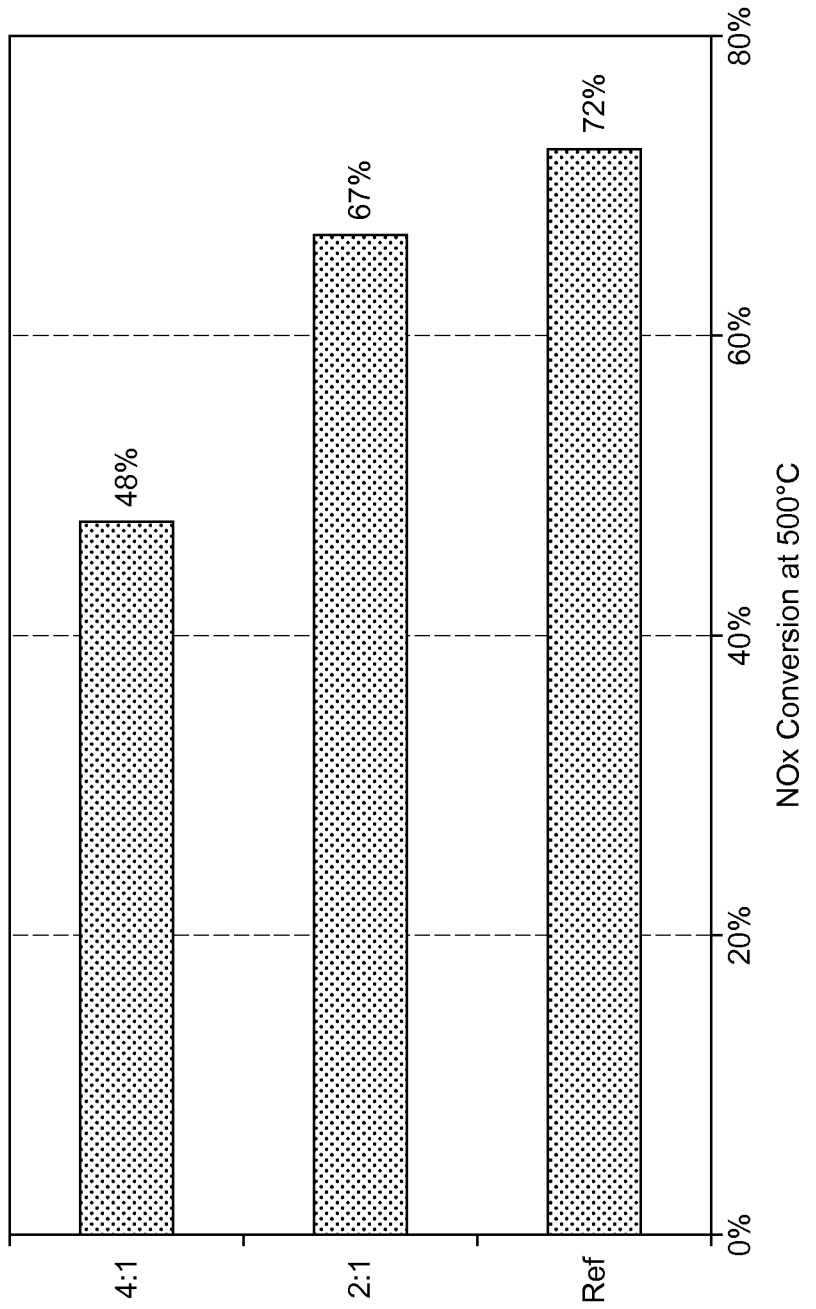
FIG. 5 is a bar chart comparing the $NO_x$ conversion activity as a function of temperature of two aged SCR catalyst cores each of which has been aged in the laboratory-scale exhaust system shown in FIG. 1 containing core samples of the diesel oxidation catalyst of Example 11 heated in a tube furnace at 900° C. for 2 hours in a flowing synthetic exhaust gas with the Cu/CHA zeolite SCR catalyst core held at 300° C. located downstream.

Taken as a whole, the results of Example 9 shown in FIG. 4 in connection with Examples 7 and 8 and Comparative Example 2 indicate that a Pt:Pd weight ratio of between 1:1 and 5:1 is beneficial in reducing the problem of $NO_x$ conversion activity loss through volatilisation of platinum group metal, principally platinum, from a platinum group metal containing catalyst to a downstream SCR catalyst; and The results of Example 12 shown in FIG. 5 in connection with Diesel Oxidation Catalysts A and B show that for a SCR catalyst aged downstream of a DOC having a 2:1 Pt:Pd weight ratio overall, the loss of $NO_x$ conversion activity is relatively slight at 67% $NO_x$ conversion activity compared with the control at 72% $NO_x$ conversion activity (a SCR catalyst aged behind a 1:1 Pt:Pd weight ratio overall DOC (not described herein) using the same protocol had a $NO_x$ conversion activity of 69%). However, when the overall Pt:Pd weight ratio was increased to 4:1, SCR activity was significantly reduced to 48%.

The inventors conclude, therefore, that there exists a boundary at about 2:1 Pt:Pd weight ratio overall above which Pt volatilisation is more likely to occur. Hence, by limiting to an overall Pt:Pd weight ratio of 2:1 in the DOC as a whole, and to ≤2:1 Pt:Pd weight ratio in the second washcoat coating layer, Pt in the DOC is less likely to volatilise and migrate to a downstream SCR catalyst.

For the avoidance of any doubt, the entire contents of any and all documents cited herein is incorporated by reference into the present application.

The invention claimed is:

1. A catalysed substrate monolith for use in treating exhaust gas emitted from a lean-burn internal combustion engine, which catalysed substrate monolith comprising a first washcoat coating and a second washcoat coating, wherein the first washcoat coating comprises a catalyst composition comprising at least one platinum group metal (PGM) and at least one support material for the at least one PGM, wherein at least one PGM in the first washcoat coating is liable to volatilise when the first washcoat coating is exposed to relatively extreme conditions including relatively high temperatures, wherein the second washcoat coating comprises at least one metal oxide for trapping volatilised PGM and a catalyst composition comprising at least one metal selected from the group consisting of palladium, silver, gold and combinations of any two or more thereof, wherein the at least one metal oxide supports the at least one metal, wherein the second washcoat coating is oriented to contact exhaust gas that has contacted the first washcoat coating, and wherein the substrate monolith is a filtering substrate monolith having inlet surfaces and outlet surfaces, wherein the inlet surfaces are separated from the outlet surfaces by a porous structure.

2. The catalysed substrate monolith according to claim 1, wherein the at least one PGM in the first washcoat coating comprises platinum.

3. The catalysed substrate monolith according to claim 2, wherein the at least one PGM in the first washcoat coating comprises both platinum and palladium.

4. The catalysed substrate monolith according to claim 3, wherein a weight ratio of Pt:Pd is ≤1.5.

5. The catalysed substrate monolith according to claim 1, wherein the at least one metal oxide of the second washcoat coating comprises a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof.

6. The catalysed substrate monolith according to claim 1, wherein the second washcoat coating comprises platinum and palladium, and wherein the weight ratio of Pt:Pd in the second washcoat coating is lower than the weight ratio of Pt:Pd in the first washcoat coating.

7. The catalysed substrate monolith according to claim 1, wherein the first washcoat coating is disposed in a first washcoat zone of the substrate monolith and the second washcoat coating is disposed in a second washcoat zone of the substrate monolith, wherein there is substantially no overlap between the first washcoat zone and the second washcoat zone.

8. The catalysed substrate monolith according to claim 7, wherein the first washcoat zone comprises inlet surfaces of the filtering substrate monolith and the second washcoat zone comprises outlet surfaces of the filtering substrate monolith, wherein the porous structure defines a transition between the first washcoat zone and the second washcoat zone.

9. The catalysed substrate monolith according to claim 1, wherein the second washcoat coating is disposed in a layer above the first washcoat coating.

10. The catalysed substrate monolith according to claim 1, wherein the filtering substrate monolith is a wall-flow filter.

11. The catalysed substrate monolith according to claim 1, wherein at least the first washcoat coating comprises an oxidation catalyst.

12. An exhaust system for a lean-burn internal combustion engine, which system comprising the catalysed substrate monolith according to claim 1 as a first catalysed substrate monolith.

13. The exhaust system according to claim 12, comprising a second catalysed substrate monolith comprising a selective catalytic reduction (SCR) catalyst, which second catalysed substrate monolith is disposed downstream from the first catalysed substrate monolith.

14. The exhaust system according to claim 13, comprising an injector for injecting a nitrogenous reductant into exhaust gas between the first catalysed substrate monolith and the second catalysed substrate monolith.

15. The exhaust system according to claim 12, comprising a third substrate monolith, wherein the third substrate monolith is a filtering substrate monolith, which third substrate monolith is disposed downstream of the second catalysed substrate monolith.

16. The exhaust system of claim 15, wherein the third substrate monolith comprises an oxidation catalyst.

17. A method of reducing or preventing a selective catalytic reduction (SCR) catalyst in an exhaust system of a lean-burn internal combustion engine from becoming poisoned with platinum group metal (PGM) which may volatilise from a first washcoat coating comprising a catalyst composition comprising at least one PGM supported on at least one support material and disposed on a substrate monolith upstream of the SCR catalyst when the catalyst composition comprising PGM is exposed to relatively extreme conditions including relatively high temperatures, which method comprising trapping volatilised PGM in a second washcoat coating comprising at least one metal oxide and a catalyst composition comprising at least one metal selected from the group consisting of palladium, silver, gold and combinations of any two or more thereof, wherein the at least one metal oxide supports the at least one metal, wherein the second washcoat coating is disposed on the same substrate monolith as the first washcoat coating and the second washcoat coating is oriented to contact exhaust gas that has contacted the first washcoat coating, and wherein the substrate monolith is a filtering substrate monolith having inlet surfaces and outlet surfaces, wherein the inlet surfaces are separated from the outlet surfaces by a porous structure.

18. A method according to claim 17, wherein the at least one metal oxide of the second washcoat coating comprises a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof.

19. A catalysed substrate monolith for use in treating exhaust gas emitted from a lean-burn internal combustion engine, which catalysed substrate monolith comprising a first washcoat coating and a second washcoat coating, wherein the first washcoat coating comprises a catalyst composition comprising at least one platinum group metal (PGM) and at least one support material for the at least one PGM, wherein at least one PGM in the first washcoat coating is liable to volatilise when the first washcoat coating is exposed to relatively extreme conditions including relatively high temperatures, wherein the second washcoat coating comprises at least one metal oxide for trapping volatilised PGM, wherein the at least one metal oxide comprises a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof, and wherein the second washcoat coating is oriented to contact exhaust gas that has contacted the first washcoat coating, and wherein the substrate monolith is a filtering substrate monolith having inlet surfaces and outlet surfaces, wherein the inlet surfaces are separated from the outlet surfaces by a porous structure.

20. The catalysed substrate monolith according to claim 19, wherein the at least one PGM in the first washcoat coating comprises platinum.

21. The catalysed substrate monolith according to claim 20, wherein the at least one PGM in the first washcoat coating comprises both platinum and palladium.

22. The catalysed substrate monolith according to claim 21, wherein a weight ratio of Pt:Pd is ≤1.5.

23. The catalysed substrate monolith according to claim 19, wherein the second washcoat coating comprises platinum and palladium, and wherein the weight ratio of Pt:Pd in the second washcoat coating is lower than the weight ratio of Pt:Pd in the first washcoat coating.

24. The catalysed substrate monolith according to claim 19, wherein the first washcoat coating is disposed in a first washcoat zone of the substrate monolith and the second washcoat coating is disposed in a second washcoat zone of the substrate monolith, wherein there is substantially no overlap between the first washcoat zone and the second washcoat zone.

25. The catalysed substrate monolith according to claim 24, wherein the first washcoat zone comprises inlet surfaces of the filtering substrate monolith and the second washcoat zone comprises outlet surfaces of the filtering substrate monolith, wherein the porous structure defines a transition between the first washcoat zone and the second washcoat zone.

26. The catalysed substrate monolith according to claim 19, wherein the second washcoat coating is disposed in a layer above the first washcoat coating.

27. The catalysed substrate monolith according to claim 19, wherein the filtering substrate monolith is a wall-flow filter.

28. The catalysed substrate monolith according to claim 19, wherein at least the first washcoat coating comprises an oxidation catalyst.

29. An exhaust system for a lean-burn internal combustion engine, which system comprising the catalysed substrate monolith according to claim 19 as a first catalysed substrate monolith.

30. The exhaust system according to claim 29, comprising a second catalysed substrate monolith comprising a selective catalytic reduction (SCR) catalyst, which second catalysed substrate monolith is disposed downstream from the first catalysed substrate monolith.

31. The exhaust system according to claim 30, comprising an injector for injecting a nitrogenous reductant into exhaust gas between the first catalysed substrate monolith and the second catalysed substrate monolith.

32. The exhaust system according to claim 29, comprising a third substrate monolith, wherein the third substrate monolith is a filtering substrate monolith, which third substrate monolith is disposed downstream of the second catalysed substrate monolith.

33. The exhaust system of claim 32, wherein the third substrate monolith comprises an oxidation catalyst.

34. A catalysed substrate monolith for use in treating exhaust gas emitted from a lean-burn internal combustion engine, which catalysed substrate monolith comprising a first washcoat coating and a second washcoat coating, wherein the first washcoat coating comprises a catalyst composition comprising at least one platinum group metal (PGM) and at least one support material for the at least one PGM, wherein at least one PGM in the first washcoat coating is liable to volatilise when the first washcoat coating is exposed to relatively extreme conditions including relatively high temperatures, wherein the second washcoat coating comprises at least one metal oxide for trapping volatilised PGM and wherein the second washcoat coating is oriented to contact exhaust gas that has contacted the first washcoat coating, wherein the first washcoat coating is disposed in a first washcoat zone and the second washcoat coating is disposed in a second washcoat, wherein there is substantially no overlap between the first washcoat zone and the second washcoat zone, and wherein the substrate monolith is a filtering substrate monolith having inlet surfaces and outlet surfaces, wherein the inlet surfaces are separated from the outlet surfaces by a porous structure.

35. The catalysed substrate monolith according to claim 34, wherein the at least one PGM in the first washcoat coating comprises platinum.

36. The catalysed substrate monolith according to claim 35, wherein the at least one PGM in the first washcoat coating comprises both platinum and palladium.

37. The catalysed substrate monolith according to claim 36, wherein a weight ratio of Pt:Pd is ≤1.5.

38. The catalysed substrate monolith according to claim 34, wherein the second washcoat coating comprises platinum and palladium, and wherein the weight ratio of Pt:Pd in the second washcoat coating is lower than the weight ratio of Pt:Pd in the first washcoat coating.

39. The catalysed substrate monolith according to claim 34, wherein the filtering substrate monolith is a wall-flow filter.

40. The catalysed substrate monolith according to claim 34, wherein the first washcoat zone comprises inlet surfaces of the filtering substrate monolith and the second washcoat zone comprises outlet surfaces of the filtering substrate monolith, wherein the porous structure defines a transition between the first washcoat zone and the second washcoat zone.

41. The catalysed substrate monolith according to claim 34, wherein at least the first washcoat coating comprises an oxidation catalyst.

42. An exhaust system for a lean-burn internal combustion engine, which system comprising the catalysed substrate monolith according to claim 34 as a first catalysed substrate monolith.

43. The exhaust system according to claim 42, comprising a second catalysed substrate monolith comprising a selective catalytic reduction (SCR) catalyst, which second catalysed substrate monolith is disposed downstream from the first catalysed substrate monolith.

44. The exhaust system according to claim 43, comprising an injector for injecting a nitrogenous reductant into exhaust gas between the first catalysed substrate monolith and the second catalysed substrate monolith.

45. The exhaust system according to claim 42, comprising a third substrate monolith, wherein the third substrate monolith is a filtering substrate monolith, which third substrate monolith is disposed downstream of the second catalysed substrate monolith.

46. The exhaust system of claim 45, wherein the third substrate monolith comprises an oxidation catalyst.

\* \* \* \* \*